Sept. 3, 1963  K. P. KERR  3,102,603
CEMENT FEEDER FOR CONCRETE MIXING PLANTS
Filed May 9, 1961  2 Sheets-Sheet 1

Inventor
Kenneth P. Kerr
By [signature]
Attorney

Sept. 3, 1963 K. P. KERR 3,102,603
CEMENT FEEDER FOR CONCRETE MIXING PLANTS
Filed May 9, 1961 2 Sheets-Sheet 2

AIR UNDER PRESSURE

Inventor
Kenneth P. Kerr
Attorney

United States Patent Office 3,102,603
Patented Sept. 3, 1963

3,102,603
CEMENT FEEDER FOR CONCRETE
MIXING PLANTS
Kenneth P. Kerr, Waukesha, Wis., assignor to Butler Bin Company, Waukesha, Wis., a corporation of Wisconsin
Filed May 9, 1961, Ser. No. 108,800
1 Claim. (Cl. 177—123)

This invention relates broadly to flow control apparatus and has as its purpose to provide a feeder for flowable material such as cement, by which a large quantity of the flowable material may be quickly delivered and at the same time accurately measured.

The problem with which this invention deals has been acutely felt in concrete mixing plants, cement block making plants and the like, and especially in the case of modern, fully automatic plants which require very rapid delivery of the cement and other aggregates, if the plant is to be operated economically.

Since it is important that the amount of cement used in a particular mix be very accurately measured, it has been the practice in the past to feed the cement at a rate slow enough to enable instantaneous complete shut-off of the flow when the proper amount had been delivered. While the rate at which the cement was fed usually was adjustable, once the adjustment was made it remained fixed. If that rate was slow enough to enable accurate measurement of the delivered cement by instantaneously stopping its flow, rapid delivery was not possible.

The present invention overcomes this objection by first allowing the delivery to be effected unrestrictedly so that a huge amount of cement, or other flowable material may be delivered within a very short time, and then greatly restricting or throttling the flow to perhaps little more than a dribble or trickle to enable instantaneous stoppage of the flow and thereby achieve utmost accuracy in the measurement of the quantity delivered.

With the above and other objects in view which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawings illustrate one complete example of the physical embodiment of the invention constructed according to the best mode so far devised for the practical application of the principles thereof, and in which:

FIGURE 2 is an enlarged detail view of the cement feeder per se, showing the same in its condition at which the flow is unrestricted and rapid; and FIGURE 3 is a view similar to FIGURE 2, but showing the flow of cement throttled or restricted.

Figure 1:
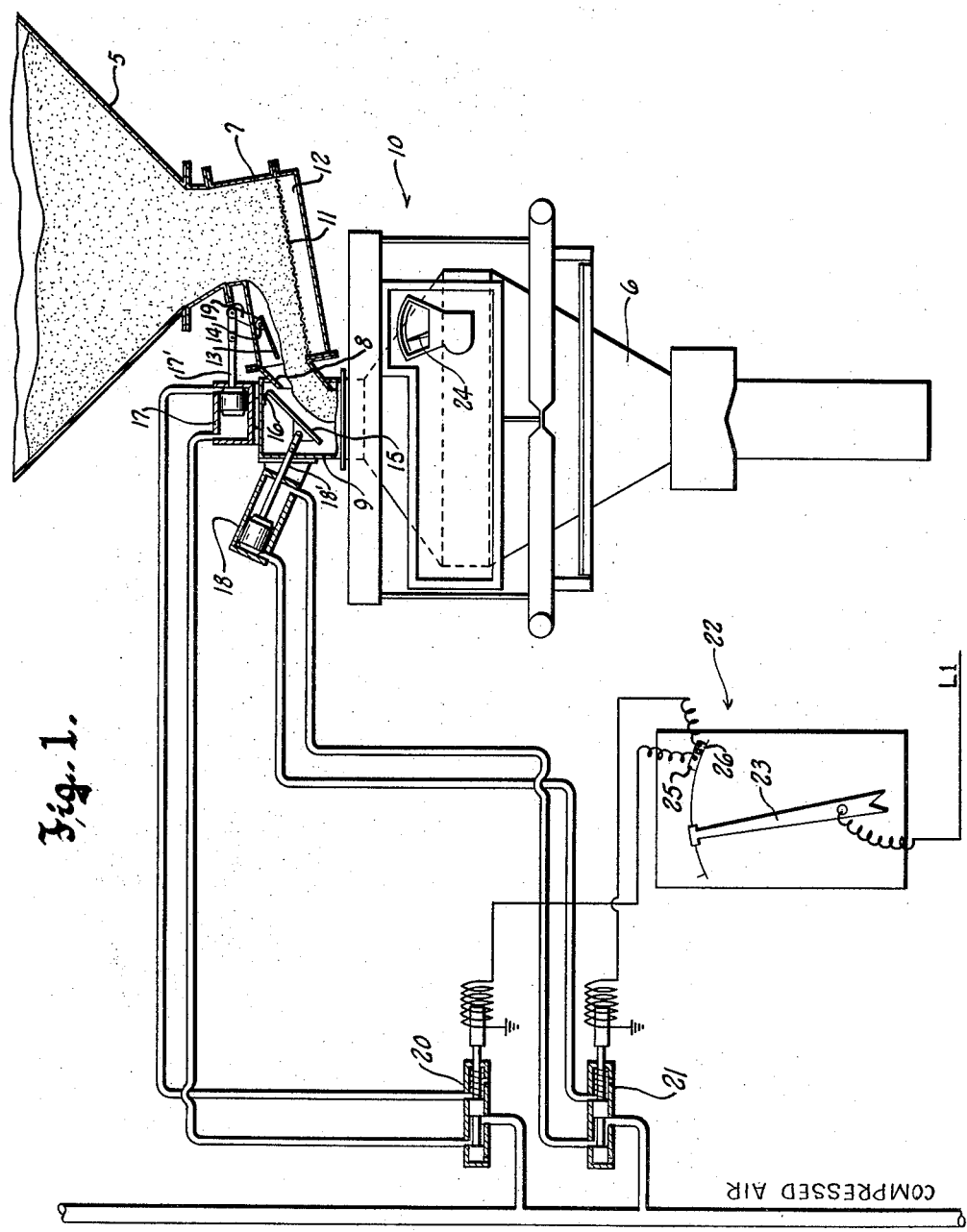
FIGURE 1 is a view more or less diagrammatically illustrating the complete invention with parts thereof broken away and in section.

Referring to the drawings, the numeral 5 designates a bin containing a supply of the cement or other flowable material to be delivered in measured amounts to a hopper 6. The delivery of the material from the bin to the hopper is through an inclined chute 7. The upper end of this chute is in open communication with the bottom of the bin, and its mouth 8 debouches into the top of the hopper 6 through a duct 9. The hopper 6 is preferably of the type known as a weighing batcher, wherein the hopper is supported from the beam of a scale, indicated generally by the numeral 10, and by means of which the hopper contents are weighed. This portion of the structure, however, forms no part of the present invention.

The chute 7 may be of the type having a perforated or foraminous bottom 11, preferably made of fabric so that air under light pressure introduced into an air space 12 beneath the bottom 11 may flow upwardly through the bottom to provide a "blanket" of air upon which the cement or other flowable material rides in its passage to the mouth of the chute. This type of chute is particularly well suited to the delivery of cement and similar material which is prone to pack.

Inside the chute, near its mouth 8, is a damper 13 which in the present instance is hingedly mounted, as at 14, to swing about a horizontal axis, from a full open position shown in FIGURE 1 and 2, allowing unrestricted flow through the chute to a regulating position shown in FIGURE 3. In its regulating position the damper 13 greatly reduces the rate of flow through the chute.

The reduction of the flow rate effected by the movement of the damper to its regulating position permits sudden and complete stoppage of flow from the mouth of the chute by closure of a shutoff valve 15. The shutoff valve 15 may be hinged, as at 16, to the top wall of the duct 9.

Actuation of the damper and the shutoff valve from one position to the other is effected by power means, and preferably by air cylinders 17 and 18, respectively.

The air cylinder 17 may be mounted on the duct 9 and has its piston connected through linkage 17' with a lever 19 fixed with respect to the damper. The cylinder 18, likewise, may be mounted on the duct 9 and its piston is connected through linkage 18' with the shutoff valve 15.

In the embodiment of the invention illustrated, solenoid valves 20 and 21 control the connection of the air cylinders with a source of compressed air (not shown). These solenoid valves are spring loaded, as shown, to so connect the cylinders with the pressure source that the damper and shutoff valve are normally in their open positions. Upon energization of the solenoids of these valves, their respective cylinders are activated to swing the damper to its regulating position, shown in FIGURE 3, and to close the shutoff valve, as shown in dotted lines in FIGURE 3.

Energization of the solenoids of the valves 20 and 21 is governed by a weight-sensing device, indicated generally by the numeral 22 in FIGURE 1. This weight-sensing device is responsive to the weight of the material in the hopper 6, and is here diagrammatically illustrated as consisting simply of a contactor 23 which moves with the indicator 24 of the scale and makes contact first with a stationary contact 25 and then—without leaving the contact 25—with a second stationary contact 26.

The contact 25 is connected in series circuit with the solenoid of the valve 20, and the contact 26 is connected in series circuit with the solenoid of the valve 21. The opposite ends of the solenoids are grounded, as shown. Thus, since the contactor 23 is connected to the hot side of an electric power supply through line LI, its engagement with the contact 25 effects actuation of the power cylinder 17 to move the damper to its regulating position. This reduces the flow rate into the hopper so that the weight of the material in the hopper now rises gradually. As it does, the contactor 23 moves along the contact 25 until it comes into engagement with the contact 26. Thereupon, the solenoid of the valve 20 is energized to actuate the valve and cause the power cylinder 18 to effect closure of the shutoff valve 15.

Obviously, in practice the control for the power cylinders 17 and 18 may be structurally different from that illustrated, but functionally it will be the same.

After the measured quantity of cement or other flowable material has been delivered to the hopper, it is discharged therefrom. This, of course, allows the weight-sensing device to restore the solenoid valves to their normal positions in which they effect opening of the damper and the shutoff valve.

From the foregoing description taken in connection with the accompanying drawings, it will be apparent to those skilled in this art that this invention provides a greatly improved feeder for cement and other similar flowable material, since it combines rapid delivery of large quantities of the material with accurate control and measurement of the amount delivered.

What is claimed as my invention is:

A cement feeder for concrete mixing plants and the like comprising the combination of: a hopper to receive a measured quantity of cement, the hopper having an inlet at its top; means to weigh the cement in the hopper; an inlet duct above the inlet of the hopper, said inlet duct having an upright side wall with an inlet opening therein; an inclined chute having its discharge end connected to said upright side wall of the inlet duct in line with the inlet opening therein so that cement flowing down the chute enters the hopper; a damper in the chute movable from a full open position providing for unrestricted flow through the chute, to a regulating position in which the damper greatly reduces the rate of flow through the chute; a shutoff valve hingedly mounted in the duct above its inlet opening to swing from an open position directing the flow of cement from the chute down into the hopper, to a closed position tightly closing the inlet opening and completely stopping the flow of cement into the hopper; and control means for the damper and the shutoff valve comprising a weight-sensing device responsive to the weight of the cement in the hopper, power means to move the damper to its regulating position, power means to move the shutoff valve to its closed position, and means governed by the weight-sensing device and connected with said two power means to actuate the first-named power means when the cement in the hopper weighs a predetermined amount less than the weight of the quantity of cement desired, and to actuate the second power means when the weight of the cement in the hopper is that of the desired amount.

References Cited in the file of this patent

UNITED STATES PATENTS

| | | |
|---|---|---|
| 2,207,885 | Howard | July 16, 1940 |
| 2,608,371 | McMahon et al. | Aug. 26, 1952 |
| 2,914,290 | Waller | Nov. 24, 1959 |